US012590207B2

(12) United States Patent
Brandt et al.

(10) Patent No.: US 12,590,207 B2
(45) Date of Patent: *Mar. 31, 2026

(54) EPOXY COMPOSITION COMPRISING A BIO-BASED EPOXY COMPOUND

(71) Applicant: Henkel AG & Co. KGaA, Duesseldorf (DE)

(72) Inventors: Adrian Brandt, Essen (DE); Alissa Besler, Neuss (DE); Horst Beck, Neuss (DE); Sascha Andronescu, Duisburg (DE); Johannes Gerardus de Vries, Rostock (DE); Sarah Kirchhecker, Rostock (DE); Bernhard M. Stadler, Rostock (DE); Sergey Tin, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 500 days.

This patent is subject to a terminal disclaimer.

(21) Appl. No.: 18/198,207

(22) Filed: May 16, 2023

(65) Prior Publication Data

US 2023/0312911 A1 Oct. 5, 2023

Related U.S. Application Data

(63) Continuation of application No. PCT/EP2021/077212, filed on Oct. 4, 2021.

(30) Foreign Application Priority Data

Nov. 16, 2020 (EP) .................................... 20207707

(51) Int. Cl.

| | |
|---|---|
| ***C08L 63/00*** | (2006.01) |
| ***C08G 59/22*** | (2006.01) |
| ***C08G 59/50*** | (2006.01) |
| ***C08G 59/54*** | (2006.01) |
| ***C08K 5/15*** | (2006.01) |

(52) U.S. Cl.

CPC ............ *C08L 63/00* (2013.01); *C08G 59/223* (2013.01); *C08G 59/5033* (2013.01); *C08G 59/504* (2013.01); *C08G 59/54* (2013.01); *C08K 5/15* (2013.01); *C08G 2150/00* (2013.01); *C08G 2170/00* (2013.01)

(58) Field of Classification Search

CPC ...... C08L 63/00-10; C09D 163/00-10; C08K 5/15-1575; C08G 59/223; C09J 163/00-10

See application file for complete search history.

(56) References Cited

U.S. PATENT DOCUMENTS

| | | | |
|---|---|---|---|
| 4,546,155 | A | 10/1985 | Hirose et al. |
| 4,833,226 | A | 5/1989 | Ishimura et al. |
| 5,077,376 | A | 12/1991 | Dooley |
| 7,226,976 | B2 | 6/2007 | Koto et al. |

FOREIGN PATENT DOCUMENTS

| | | | |
|---|---|---|---|
| GB | 1121196 | A | 7/1968 |
| JP | 2008214567 | A | 9/2008 |
| WO | 2019234038 | A1 | 12/2019 |
| WO | 2020212149 | A1 | 10/2020 |

OTHER PUBLICATIONS

Ortuno et al., "Beta-Angelica Lactone Epoxide: Chemical Behaviour and some Synthetic Applications," J. Heterocyclic Chem. 24, 79-87 (Year: 1987).*

Ortuno at al., "Enantiomeric Beta-Angelica Lactone Epoxides: Their Syntheeses from Chiral Precursors and their Use in the Preparation of Blastmycinone," Tetrahedron 43(9), 2191-2198 (Year: 1987).*

Kuramochi et al., "Generation and reaction of an oxiranyl anion derived from alpha, beta-epoxy-gamma-butyrolactone," Tetrahedron Lett. 40, 7367-7370 (Year: 1999).*

Miyagawa H et al: "Fracture Toughness Andimpact Strength of Anhydride-Curedbiobased Epoxy", Polymer Engineering and Science, Brookfield Center, US, vol. 45, No. 4, Apr. 1, 2005 (Apr. 1, 2005), pp. 487-495, XP001227904, ISSN: 0032-3888, Doi: 10.1002/PEN.20290* the whole document *.

European Search Report, EP 20207707.9, dated Apr. 9, 2021.

PCT International Search Report—WO PCT/EP2021/077212—Completed: Dec. 7, 2021 Mailing date: Jan. 4, 2022—No. of pp. 4.

* cited by examiner

*Primary Examiner* — Kregg T Brooks

(57) ABSTRACT

The present invention relates to an epoxy composition comprising a) an epoxy resin; b) a curing agent; and c) a bio-based epoxy compound having a structure I:

(I)

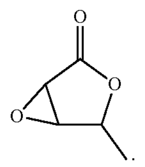

The composition according to the present invention can be used as a structural adhesive, a coating and a primer.

15 Claims, No Drawings

EPOXY COMPOSITION COMPRISING A BIO-BASED EPOXY COMPOUND

TECHNICAL FIELD

The present invention relates to an epoxy composition comprising a) an epoxy resin; b) a curing agent; and c) a bio-based epoxy compound having a structure I:

(I)

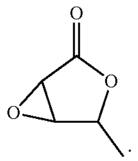

BACKGROUND OF THE INVENTION

Adhesive bonds and polymeric coatings are commonly used in the assembly and finishing of manufactured goods. They are used in place of mechanical fasteners, such as screws, bolts and rivets, to provide bonds with reduced machining costs and greater adaptability in the manufacturing process. Adhesive bonds distribute stresses evenly, reduce the possibility of fatigue and seal the joints from corrosive species.

Epoxy adhesives consist primarily of epoxy monomers and oligomers and epoxy based reactive diluents. There is a constant need for new chemicals having new technical properties. For example, low odour and low vapor pressure monomers to improve health and safety of a production line and end users.

These epoxy monomers and oligomers and epoxy based reactive diluents are traditionally produced using petrol-based raw materials. To increase sustainability, the end users of the epoxy adhesives are now requesting products with increased bio-based content without compromising performance.

Therefore, there is a need for epoxy adhesives comprising new chemicals obtained from increased quantities of bio-based raw material without losing desired physical properties and performance.

SUMMARY OF THE INVENTION

The present invention relates to an epoxy composition comprising a) an epoxy resin; b) a curing agent; and c) a bio-based epoxy compound having a structure I:

(I)

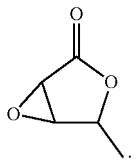

The present invention encompasses a cured product of an epoxy composition according the present invention.

The present invention relates to use of an epoxy composition according to the present invention as a structural adhesive, a coating, or a primer.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms “a”, “an” and “the” include both singular and plural referents unless the context clearly dictates otherwise.

The terms “comprising”, “comprises” and “comprised of” as used herein are synonymous with “including”, “includes” or “containing”, “contains”, and are inclusive or open-ended and do not exclude additional, non-recited members, elements or method steps.

As used herein, the term “consisting of” excludes any element, ingredient, member or method step not specified.

The recitation of numerical end points includes all numbers and fractions subsumed within the respective ranges, as well as the recited end points.

All percentages, parts, proportions and then like mentioned herein are based on weight unless otherwise indicated.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in disclosing the invention, including technical and scientific terms, have the meaning as commonly understood by one of the ordinary skilled in the art to which this invention belongs to. By means of further guidance, term definitions are included to better appreciate the teaching of the present invention.

The present invention relates to an epoxy composition comprising a) an epoxy resin; b) a curing agent; and c) a bio-based epoxy compound having a structure I:

(I)

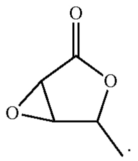

The bio-based epoxy compound I is preferably a β-isomer.

The epoxy compound having a structure I is synthesized from levulinic acid (LA) as illustrated in schemes 1-3 below. Scheme 1 below illustrates synthesis of alpha-angelica lactone (α-AL) from levulinic acid (LA) by a reactive distillation.

Scheme 1.

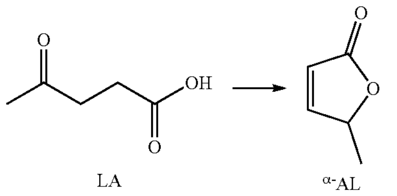

Route to obtain β-angelica lactone (β-AL) from α-AL is illustrated in scheme 2 below. α-AL is isomerized to β-AL by using triethylamine as a catalyst at 100° C. without the use of a solvent. A mixture of β-AL: α-AL-80:20 is reached after one hour. It has been found that increasing the reaction time does not yield higher β-AL content, because dimerization of the lactones is a competing side reaction. β-AL can be obtained in a yield of up to 37%.

Scheme 2.

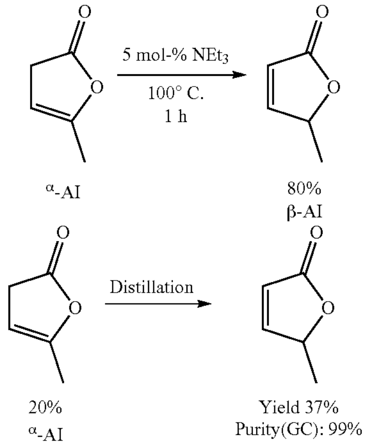

Scheme 3 below illustrates how epoxy compound having a structure I is synthesized by oxidation of β-AL by using NaOCl in pyridine or $H_2O_2$ in THF with Triton B as base and phase transfer agent.

Scheme 3

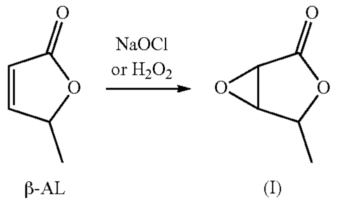

The bio-based epoxy compound having a structure I preferably consists of 100% bio-based carbon atoms according ASTM D6866.

The bio-based epoxy compound having a structure I may be present in a composition according to the present invention in a quantity of from 0.1 to 30% by weight based on the total weight of the composition, preferably from 1 to 25%, more preferably from 1.5 to 20% and even more preferably from 1.75 to 15%.

The Applicant has found out that these quantities are preferred because higher quantities than 30% may lead to a high exothermic reaction which may shorten the pot life. Further, higher quantities may lead settling of the inorganic fillers (used as tougheners). Quantities lower than 0.1% may not provide desired technical effect.

The Applicant has found out that addition of the bio-based epoxy compound having a structure I into an epoxy-based adhesive will provide low viscosity which is ideal for wetting and easier application by dispensing and pumping. In addition, low viscosity provides more flexibility to the formulation in form of possibility of using ingredients such as fillers and high viscous resins. The technical data in the example section indicates that use of bio-based epoxy compound having a structure I provides increased flexibility (tensile test) while maintaining Tg in dynamic mechanical analysis and this is good for impact resistance. Further, bio-based epoxy compound having a structure I enables a fast cure and improves wash-off resistance.

An epoxy composition according to the present invention comprises an epoxy resin.

Epoxy resins as used herein may include mono-functional epoxy resins, multi- or poly-functional epoxy resins, and combinations thereof. The epoxy resins may be pure compounds but equally may be mixtures epoxy functional compounds, including mixtures of compounds having different numbers of epoxy groups per molecule. An epoxy resin may be saturated or unsaturated, aliphatic, cycloaliphatic, aromatic or heterocyclic and may be substituted. Further, the epoxy resin may also be monomeric or polymeric.

Without intention to limit the present invention, illustrative monoepoxide compounds include: alkylene oxides; epoxy-substituted cycloaliphatic hydrocarbons, such as cyclohexene oxide, vinylcyclohexene monoxide, (+)-cis-limonene oxide, (+)-cis, trans-limonene oxide, (−)-cis, trans-limonene oxide, cyclooctene oxide, cyclododecene oxide and α-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being particularly suitable monoepoxide compounds for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In an embodiment, the monoepoxide compound conforms to Formula (I) herein below:

(I)

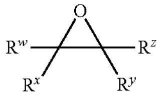

wherein: $R^w$, $R^x$, $R^y$ and $R^z$ may be the same or different and are independently selected from hydrogen, a halogen atom, a $C_1$-$C_8$alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^y$ and $R^z$ is not hydrogen.

It is preferred that $R^w$, $R^x$ and $R^y$ are hydrogen and $R^z$ is either a phenyl group or a $C_1$-$C_8$ alkyl group and, more preferably, a $C_1$-$C_4$ alkyl group.

Having regard to this embodiment, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

Again, without intention to limit the present invention, suitable polyepoxide compounds may be liquid, solid or in solution in solvent. Further, such polyepoxide compounds should have an epoxide equivalent weight of from 100 to 700 g/eq, for example from 120 to 320 g/eq. And generally, diepoxide compounds having epoxide equivalent weights of less than 500 g/eq. or even less than 400 g/eq. are preferred: this is predominantly from a costs standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and amides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid $C_1$-$C_{18}$ alkyl esters; butadiene diepoxide; polybutadiene diglycidyl ether; vinylcyclohexene diepoxide; and, limonene diepoxide. Further illustrative polyepoxide compounds include but are not limited to glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

The above aside, the composition can in certain embodiments comprise glycidoxy alkyl alkoxy silanes having the formula:

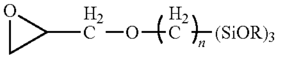

wherein: each R is independently selected from methyl or ethyl; and, n is from 1-10.

Exemplary silanes include but are not limited to: γ-glycidoxy propyl trimethoxy silane, γ-glycidoxy ethyl trimethoxy silane, γ-glycidoxy methyl trimethoxy silane, γ-glycidoxy methyl triethoxy silane, γ-glycidoxy ethyl triethoxy silane, γ-glycidoxy propyl triethoxy silane; and, 8-glycidooxyoctyl trimethoxysilane. When present, the epoxide functional silanes should constitute less than less than 20 wt. %, preferably less than 10 wt. % or less than 5 wt. %, based on the total weight of the epoxide compounds.

The present invention also does not preclude the curable compositions from further comprising one or more cyclic monomers selected from the group consisting of: oxetanes; cyclic carbonates; cyclic anhydrides; and lactones.

Biobased epoxy resins are preferred. For example epoxy resins derived from cashew nut shell liquid oil, epoxy resins derived from soybean oil, epoxy resins derived from linseed, epoxy resins derived from rape seed and epoxy resins derived from sun flower, limonene oxide, limonene dioxide, epoxy resin derived from cashew nut shell liquid, sorbitol based polyepoxy resin, glycerol based polyepoxy resin, ethylglycol diepoxy resin are bio-based epoxy resins suitable for use in the present invention.

Non-limiting commercially available examples are KET-L3000 from Kolon industries is glycerol-based polyepoxy and it can be 100% bio-based alternatively KET-L6000 from Kolon industries is sorbitol-based polyepoxy and it can be 100% bio-based.

Preferably said epoxy resin is selected from the group consisting of bisphenol A epoxy resins, bisphenol F epoxy resins, biphenyl epoxy resins, naphthalene epoxy resins, diphenyl ether epoxy resins, diphenyl thioether epoxy resins, hydroquinone epoxy resins, biphenyl novolac epoxy resins, cresol novolac epoxy resins, phenol novolac epoxy resins, bisphenol A novolac epoxy resins, trisphenol epoxy resins, tetraphenylolethane epoxy resins, cycloaliphatic epoxy resins, epoxy resins derived from cashew nut shell liquid oil, epoxy resins derived from soybean oil, epoxy resins derived from linseed, epoxy resins derived from rape seed and epoxy resins derived from sun flower, limonene oxide, limonene dioxide, epoxy resin derived from cashew nut shell liquid, sorbitol based polyepoxy resin, glycerol based polyepoxy resin, ethylglycol diepoxy resin and mixtures thereof.

Bio-based epoxy resins are particularly preferred to increase the quantity of bio-based chemicals in the composition. However, the quantity is increased without losing physical properties.

Suitable commercially available epoxy resins comprising at least one vinyl-group for use in the present invention include but are not limited to bisphenol-A epoxy resins, such as DER™ 331, DER™ 330, DER™ 337 and DER™ 383; bisphenol-F epoxy resins, such as DER™ 354; bisphenol-A/F epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE;

solutions of bisphenol-A solid epoxy resins, such as DER™ 671-X75; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; and, sorbitol glycidyl ether, such as ERISYS™ GE-60.

An epoxy resin may be present in an epoxy composition according to the present invention in a quantity of from 1 to 75% by weight based on the total weight of the composition, preferably from 1 to 60%, more preferably from 1.5 to 50% and even more preferably from 1.75 to 40%.

The composition according to the present invention comprises a curing agent, wherein said curing agent is selected from the group consisting of a latent curing agent, an amine, a thiol, Mannich base, phenolic nucleophiles and mixtures thereof.

In one embodiment according to the present invention an epoxy composition is 1k composition. Suitable curing agent used in 1k composition is a latent curing agent.

The term "latent" as used herein is meant to refer to an inert functional group which can be selectively converted to a reactive functional group at the appropriate point in the synthetic sequence: the triggering event for this conversion may be inter alia moisture, heat or irradiation.

As the latent curing agent, those generally used in the technical field of UV-curing or thermosetting adhesives can be used. Examples of the latent curing agent include amine, polyamine, imidazole, and the like. Any common latent epoxy curing agents used in the art can be used in the present invention without special limitations. For example, suitable latent epoxy curing agents used herein are described in U.S. Pat. Nos. 4,546,155, 7,226,976, 4,833,226, JP2008214567, GB1, 121,196, and U.S. Pat. No. 5,077,376.

Examples of commercially available latent epoxy curing agents include Amicure PN-23, PN-40, PN-H, MY-24, PN-50 from Ajinomoto Co., Inc.; EH-4337S, EH-3293S, EH-4357S from Asahi Denka Co. Ltd.; Novacure HX-3722, HXA-3921HP from Asahi Kasei Kogyo. K.K.; Sunmide LH-210, Ancamin 2014AS/FG, Ancamin 2337S from Air Products and Chemicals, Inc.

Other suitable latent epoxy curing agents include dicyandiamide and its' derivates, imidazoles such as 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethyl-imidazole, 2,4-diamino-8-2-methylimidazolyl-(1)-ethyl-5-triazine, additional products of triazine with isocyanuric acid, succinohydrazide, adipohydrazide, isophtholohydrazide, o-oxybenzohydrazide, salicylohydrazide, 4,4'-diaminodiphenylsulphone and 3,3'-diaminodiphenylsulphone.

And of course, combination of different latent curing agents is also desirable for use herein.

In another embodiment according to the present invention an epoxy composition is 2k composition. In this embodiment the 2k epoxy composition comprises a first component and a second component wherein said curing agent is in a different component than said epoxy resin and said epoxy compound having structure I.

Suitable curing agent used in 2k composition is a curing agent selected from the group consisting of an amine, a thiol, an anhydride, Mannich base and mixtures thereof. The curing agent may consist of at least one compound possessing at least two epoxide reactive groups per molecule. Therefore, curatives may, in particular, include one or more of: i) at least one polyamine having at least two amine hydrogens reactive toward epoxide groups; ii) at least one mercapto compound having at least two mercapto groups reactive toward epoxide groups; and, iii) at least one Mannich base.

The at least one polyamine having at least two amine hydrogens reactive toward epoxide groups should, in particular, contain primary and/or secondary amine groups and have an equivalent weight per primary or secondary amine group of not more than 150 g/eq., more preferably not more than 125 g/eq.

Suitable polyamines, which may be used alone or in combination, include but are not limited to the following:

i) Aliphatic, cycloaliphatic or arylaliphatic primary diamines of which the following examples may be mentioned: 2,2-dimethyl-1,3-propanediamine; 1,3-pentanediamine (DAMP); 1,5-pentanediamine; 1,5-diamino-2-methylpentane (MPMD); 2-butyl-2-ethyl-1,5-pentanediamine (C11-neodiamine); 1,6-hexanediamine (hexamethylenediamine, HMDA); 2,5-dimethyl-1,6-hexanediamine; 2,2,4- and/or 2,4,4-trimethylhexamethylenediamine; 1,7-heptanediamine; 1,8-octanediamine; 1,9-nonanediamine; 1,10-decanediamine; 1,11-undecanediamine; 1,12-dodecanediamine; 1,2-, 1,3- and 1,4-diaminocyclohexane; bis(4-aminocyclohexyl) methane; bis(4-amino-3-methylcyclohexyl) methane; bis(4-amino-3-ethylcyclohexyl) methane; bis(4-amino-3,5-dimethylcyclohexyl) methane; bis(4-amino-3-ethyl-5-methylcyclohexyl) methane; 1-amino-3-aminomethyl-3,5,5-trimethylcyclohexane (isophorone diamine, IPDA); 2- and/or 4-methyl-1,3-diaminocyclohexane; 1,3-bis(aminomethyl)-cyclohexane; 1,4-bis (aminomethyl)cyclohexane; 2,5 (2,6)-bis(aminomethyl)-bicyclo[2.2.1]heptane (norborane diamine, NBDA); 3 (4),8 (9)-bis(aminomethyl)tricyclo[5.2.1.02, 6]-decane (TCD-diamine); 1,4-diamino-2,2,6-trimethylcyclohexane (TMCDA); 1,8-menthanediamine; 3,9-bis(3-aminopropyl)-2,4,8, 10-tetraoxaspiro[5.5] undecane; and, 1,3-bis(aminomethyl)benzene (MXDA).

ii) Tertiary amine group-containing polyamines with two or three primary aliphatic amine groups of which the following specific examples may be mentioned: N,N'-bis(aminopropyl)-piperazine; N,N-bis(3-aminopropyl) methylamine; N,N-bis(3-aminopropyl)ethylamine; N,N-bis(3-aminopropyl) propylamine; N,N-bis(3-aminopropyl)cyclohexylamine; N,N-bis(3-aminopropyl)-2-ethyl-hexylamine; tris(2-aminoethyl)amine; tris(2-aminopropyl)amine; tris(3-aminopropyl)amine; and, the products from the double cyanoethylation and subsequent reduction of fatty amines derived from natural fatty acids, such as N,N-bis(3-aminopropyl) dodecylamine and N,N-bis(3-aminopropyl) tallow alkylamine, commercially available as Triameen® Y12D and Triameen® YT (from Akzo Nobel).

iii) Ether group-containing aliphatic primary polyamines of which the following specific examples may be mentioned: bis(2-aminoethyl) ether; 3,6-dioxaoctane-1,8-diamine; 4,7-dioxadecane-1,10-diamine; 4,7-dioxadecane-2,9-diamine; 4,9-dioxadodecane-1, 12-diamine; 5,8-dioxadodecane-3,10-diamine; 4,7,10-trioxatridecane-1,13-diamine and higher oligomers of these diamines; bis(3-aminopropyl) polytetrahydrofuranes and other polytetrahydrofuran diamines; cycloaliphatic ether group-containing diamines obtained from the propoxylation and subsequent amination of 1,4-dimethylolcyclohexane, such as that material commercially available as Jeffamine® RFD-270 (from Huntsman); polyoxyalkylenedi- or -triamines obtainable as products from the amination of polyoxyalkylenedi-and-triols and which are commercially available under the name of Jeffamine® (from Huntsman), under the name of polyetheramine (from BASF) or under the name of PC Amines® (from Nitroil). A particular preference may be noted for the use of Jeffamine® D-230, Jeffamine® D-400, Jeffamine® D-600, Jeffamine® D-2000, Jeffamine® D-4000, Jeffamine® T-403, Jeffamine® T-3000, Jeffamine® T-5000, Jeffamine® EDR-104, Jeffamine® EDR-148 and Jeffamine® EDR-176, as well as corresponding amines from BASF or Nitroil.

iv) Primary diamines with secondary amine groups of which the following examples may be mentioned: 3-(2-aminoethyl)aminopropylamine, bis(hexamethylene)triamine (BHMT); diethylenetriamine (DETA); triethylenetetramine (TETA); tetraethylenepentamine (TEPA); pentaethylenehexamine (PEHA); higher homologs of linear polyethyleneamines, such as polyethylene polyamines with 5 to 7 ethyleneamine units (so-called "higher ethylenepolyamine," HEPA); products from the multiple cyanoethylation or cyanobutylation and subsequent hydrogenation of primary di- and polyamines with at least two primary amine groups, such as dipropylenetriamine (DPTA), N-(2-aminoethyl)-1,3-propanediamine (N3-amine), N,N'-bis(3-aminopropyl)ethylenediamine (N4-amine), N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine or N,N'-bis(3-amino-1-ethylpropyl)-2-methyl-1,5-pentanediamine.

v) Polyamines with one primary and at least one secondary amino group of which the following examples may be mentioned: N-butyl-1,2-ethanediamine; N-hexyl-1,2-ethanediamine; N-(2-ethylhexyl)-1,2-ethanediamine; N-cyclohexyl-1,2-ethanediamine; 4-aminomethyl-piperidine; N-(2-aminoethyl) piperazine; N-methyl-1,3-propanediamine; N-butyl-1,3-propanediamine; N-(2-ethylhexyl)-1,3-propanediamine; N-cyclohexyl-1,3-propanediamine; 3-methylamino-1-pentylamine; 3-ethylamino-1-pentylamine; 3-cyclohexylamino-1-pentylamine; fatty diamines such as N-cocoalkyl-1,3-propanediamine; products from the Michael-type addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted in a 1:1 molar ratio; products from the partial reductive alkylation of primary polyamines with aldehydes or ketones, especially N-monoalkylation products of the previously mentioned polyamines with two primary amine groups and in particular of 1,6-hexanediamine, 1,5-diamino-2-methylpentane, 1,3-bis(aminomethyl)cyclohexane, 1,4-bis(aminomethyl)cyclohexane, 1,3-bis(aminomethyl)benzene, BHMT, DETA, TETA, TEPA, DPTA, N3-amine and N4-amine, wherein preferred alkyl groups are benzyl, isobutyl, hexyl and 2-ethylhexyl; and, partially styrenated polyamines such as those commercially available as Gaskamine® 240 (from Mitsubishi Gas Chemical).

vi) Secondary diamines and, in particular, N,N'-dialkylation products of the previously mentioned polyamines with two primary amine groups, especially N,N'-dialkylation products of 1,6-hexanediamine, 1,5-diamino-2-methylpentane, 1,3-bis(aminomethyl)cyclohexane, 1,4-bis(aminomethyl)-cyclohexane, 1,3-bis(aminomethyl)benzene, BHMT, DETA, TETA, TEPA, DPTA, N3-amine or N4-amine, wherein preferred alkyl groups are 2-phenylethyl, benzyl, isobutyl, hexyl and 2-ethylhexyl.

vii) Aromatic polyamines of which mention may be made of: m- and p-phenylenediamine; 4,4'-, 2,4' and 2,2'-diaminodiphenylmethane; 3,3'-dichloro-4,4'-diaminodiphenylmethane (MOCA); 2,4- and 2,6-tolylenediamine; mixtures of 3,5-dimethylthio-2,4-and-2,6-tolylenediamine (available as Ethacure® 300 from Albermarle); mixtures of 3,5-diethyl-2,4-and-2,6-tolylene diamine (DETDA); 3,3',5,5'-tetraethyl-4,4'-diaminodiphenylmethane (M-DEA); 3,3',5,5'-tetraethyl-2,2'-dichloro-4,4'-diaminodiphenylmethane (M-CDEA); 3,3'-diisopropyl-5,5'-dimethyl-4,4'-diaminodiphenylmethane (M-MIPA); 3,3',5,5'-tetraisopropyl-4,4'-diaminodiphenylmethane (M-DIPA); 4,4'-diamino diphenyl-sulfone (DDS); 4-amino-N-(4-aminophenyl)benzenesulfonamide; 5,5'-methylenedianthranilic acid; dimethyl-(5,5'-methylenedianthranilate); 1,3-propylene-bis(4-aminobenzoate); 1,4-butylene-bis(4-aminobenzoate); polytetramethylene oxide-bis(4-aminobenzoate) (available as Versalink® from Air Products); 1,2-bis(2-aminophenylthio) ethane, 2-methylpropyl-(4-chloro-3,5-diaminobenzoate); and, tert.butyl-(4-chloro-3,5-diaminobenzoate).

viii) Polyamidoamines of which indicative members include the reaction products of monohydric or polyhydric carboxylic acids or the esters or anhydrides thereof, —in particular dimer fatty acids—and an aliphatic, cycloaliphatic or aromatic polyamine, for instance polyalkyleneamines such as DETA or TETA. Commercially available polyamidoamines include: Versamid® 100, 125, 140 and 150 (from Cognis); Aradur® 223, 250 and 848 (from Huntsman); Euretek® 3607 and 530 (from Huntsman); and, Beckopox® EH 651, EH 654, EH 655, EH 661 and EH 663 (from Cytec).

Preferred among the aforementioned polyamines having at least two primary aliphatic amine groups are: isophorone diamine (IPDA); hexamethylene diamine (HMDA); 1,3-bis(amino-methyl)cyclohexane; 1,4-bis(aminomethyl)cyclohexane; bis(4-amino-cyclohexyl) methane; bis(4-amino-3-methylcyclohexyl) methane; NBDA; and, ether group-containing polyamines with a number average molecular weight (Mn) of up to 500 g/mol. Particularly preferred among said ether group-containing polyamines are Jeffamine® D-230 and D-600 (available from Huntsman).

As noted above, the composition of the present invention may optionally comprise at least one compound which has at least two reactive mercapto-groups per molecule. Suitable mercapto-group containing compounds, which may be used alone or in combination, include but are not limited to the following.

Liquid mercaptan-terminated polysulfide polymers of which commercial examples include: Thiokol® polymers (available from Morton Thiokol), in particular the types LP-3, LP-33, LP-980, LP-23, LP-55, LP-56, LP-12, LP-31, LP-32 and LP-2 thereof; and, Thioplast® polymers (from Akzo Nobel), in particular the types G10, G112, G131, G1, G12, G21, G22, G44 and G 4.

Mercaptan-terminated polyoxyalkylene ethers, obtainable by reacting polyoxyalkylenedi-and-triols either with epichlorohydrin or with an alkylene oxide, followed by sodium hydrogen sulfide.

Mercaptan-terminated compounds in the form of polyoxyalkylene derivatives, known under the trade name of Capcure® (from Cognis), in particular the types WR-8, LOF and 3-800 thereof.

Polyesters of thiocarboxylic acids of which particular examples include: pentaerythritol tetramercapto-acetate (PETMP); trimethylolpropane trimercaptoacetate (TMPMP) (commercially available from Bruno Bock-Thiocure series); glycol dimercaptoacetate; and, the esterification products of polyoxyalkylene diols and triols, ethoxylated trimethylolpropane and polyester diols with thiocarboxylic acids such as thioglycolic acid and 2- or 3-mercaptopropionic acid.

2,4,6-trimercapto-1,3,5-triazine, 2,2'-(ethylenedioxy)-diethanethiol (triethylene glycol dimercaptan) and/or ethanedithiol.

A preference for the use of polyesters of thiocarboxylic acids and, in particular, for the use of at least one of pentaerythritol tetramercapto-acetate (PETMP), trimethylolpropane trimercaptoacetate (TMPMP) and glycol dimercaptoacetate is acknowledged.

As noted above, the curative may comprise at least one Mannich base.

Such compounds may be characterized by containing at least one phenalkamine and, in particular, a phenalkamine obtained from the condensation of cardanol (CAS Number: 37330-39-5), an aldehyde and an amine. The reactant amine in the condensation reaction is desirably ethylenediamine or diethyltriamine.

Mannich bases and phenalkamines are known in the art and suitable examples include the commercially available phenalkamines Cardolite® NC-541, NC-557, NC-558, NC-566, Lite 2001 and Lite 2002 (available from Cardolite), Aradur® 3440, 3441, 3442 and 3460 (available from Huntsman) and Beckopox® EH 614, EH 621, EH 624, EH 628 and EH 629 (available from Cytec).

A curing agent may be present in an epoxy composition according to the present invention in a quantity of from 20 to 60% by weight based on the total weight of the composition, preferably from 25 to 55%, more preferably from 30 to 55% and even more preferably from 35 to 50%.

The applicant has found out that these levels provide ideal cure, when the quantity of the curing agent too high, it results in uncured and soft networks and occational amine leakage (toxic and bad odour), whereas too low quantity leads to similar results but unreacted epoxy groups.

An epoxy composition according to the present invention may further comprise a toughener. In general, any toughener can be used in the composition according to the present invention.

Suitable tougheners to be used in the present invention are for examples (non-limiting examples).

OH or acid terminated polyols such as polyethers (PEG, PPG, PTHF and Velvetol) and polyesters (polyester polyols, polyester diols, fatty acid modified bisphenol A diglycidyl ether);

core shell particles such as PMMA shell and styrene-polybutadiene core or polybutadiene core or polysiloxane core;

non-reactive toughener rubbery materials and fillers such as capped elastomeric urethanes, block copolymer rubbers such as styrene-butadiene-isoprene based block copolymers, styrene-isoprene-styrene block copolymers and other rubbery block-copolymers;

reactive-toughener rubbery materials such as liquid rubbers with two or more epoxy-reactive groups (e.g. amine-, OH- and acid-terminated) such as butadiene-acrylonitrile-based rubbers, carboxyl-terminated butadiene-acrylonitrile (CTBN) with different contents of acrylonitrile (AN), amino-terminated butadiene-acrylonitrile (ATBN), epoxy-terminated butadiene-acrylonitrile (ETBN), and vinyl-terminated butadiene-acrylonitrile (VTBN); OH-terminated polyether polyols (PEG, PPG, PTHF type, 1.3-propane diol-based), OH-terminated polyethers based on cashew nut shell liquid, OH- or acid-terminated polyesters, OH-terminated thermoplastic polyurethanes, HTPB (hydroxyl-terminated polybutadiene), epoxidized HTPB, polyfarnesene based polyols, amine-terminated polyethers (Jeffamines), epoxy-capped elastomeric polyethers or polyesters (e.g. based on dimerized fatty acids);

inorganic fillers and reinforcing agents that can also act as toughener such as calcium carbonate, barium sulfate, calcium oxide, talc, carbon black, textile fibers, glass particles or fibers, aramid pulp, boron fibers, carbon fibers, mineral silicates, mica, powdered quartz, hydrated aluminum oxide, bentonite, various alumina-silicates including clays such as wollastonite and kaolin, fumed silica, silica aerogel, polyurea compounds, polyamide compounds and metal powders such as aluminum powder or iron powder;

bio-based tougheners that reduce Tg and increase flexibility such as cardolite based tougheners (OH-terminated and epoxy terminated), bio-based polyether polyol, polyfarnesene polyol, TPUs made from bio-based polyols and croda-B toughener (polyester with epoxy termination).

Preferably said toughener is selected from the group consisting of core shell rubber particles, liquid rubbers with two or more epoxy-reactive groups, OH-terminated polyether polyols, OH-terminated thermoplastic polyurethanes, OH-terminated polyethers, polyether urethanes, polyether rubber modified epoxy resins, fatty acid modified epoxy resins, polyether amine epoxy resins, rubber particles, styrene-butadiene-isoprene based block copolymers, polytetrahydrofuran-based toughener, cardolite toughener (PEG or EO modified Cardanol or glycidyl modified cardanol dimer (two epoxies)), polyfarnesene polyol, capped elastomeric urethanes, block copolymer rubbers, epoxy-capped elastomeric polyethers, epoxy-capped elastomeric polyesters, inorganic fillers, reinforcing agents and mixtures thereof.

Example of commercially available toughener include but is not limited to Kane Ace MX153 from Kaneka.

A toughener may be present in an epoxy composition according to the present invention in a quantity of from 0.1 to 50% by weight based on the total weight of the composition, preferably from 5 to 45%, more preferably from 10 to 40% and even more preferably from 20 to 40%.

The applicant has found the above ranges suitable for the composition according to the present invention. Too high toughener quantities may lead to poor adhesion properties, poor Tg value and undesired viscosity, whereas too low quantity may lead to a brittle system which is no longer applicable.

An epoxy composition according to the present invention may further comprise a reactive diluent. Suitable diluents for use in the present invention are for example methyl ethyl ketone (MEK), dimethylformamide (DMF), ethyl alcohol, propylene glycol methyl ether, propylene glycol methyl ether acetate, dibutyl phthalate, dioctyl phthalate, styrene, low molecular weight polystyrene, styrene oxide, allyl glycidyl ether, phenyl glycidyl ether, butyl glycidyl ether, vinylcyclohexene oxide, neopentylglycol diglycidyl ether, butanediol diglycidyl ether, hexanediol diglycidyl ether, diethylene glycol diglycidyl ether, dipropylene glycol diglycidyl ether poly(propylene glycol) diglycidyl ether, thiodiglycol diglycidyl ether, epsiloncaprolactam, butyrolactone, acrylonitrile, and mixtures thereof.

Examples of commercially available reactive diluents include but are not limited to DER 732, DER 736 from Palmer Holland, Cardura E10P from Exion and Efka 5381 from BASF.

A reactive diluent may be present in an epoxy composition according to the present invention in a quantity of from 0.2 to 15% by weight based on the total weight of the composition, preferably from 0.1 to 7.5%.

An adhesion promoter may be added to an epoxy composition according to the present invention to improve the adhesion of the epoxy resin to a substrate. Adhesion promoters may function by forming a new layer at the interface which binds strongly to both the substrate and the coating. The resultant interfacial region may also be more resistant to chemical attack from the environment.

The selection of adhesion promoter may be determined by the type of surface to which the composition will be applied. That said, the most common commercial adhesion promoters are organosilanes of which certain epoxy functional organosilanes types have been mentioned hereinbefore. Further types of adhesion promoter which may find utility herein include: organometallic compounds such as titanates and zirconates, of which specific examples include isopropyl tri (N-ethylaminoethylamino) titanate, tetraisopropyl di(d-ioctylphosphito) titanate, neoalkoxytrisneodecanoyl zirconate and zirconium propionate; dihydric phenolic compounds such as catechol and thiodiphenol; hydroxyl amines such as tris(hydroxymethyl)aminomethane; polyhydric phenols such as pyrogallol, gallic acid, or tannic acid; phosphoric acid esters such as tricresylphosphate and, plastisols, which are suspensions of polyvinyl chloride particles in a plasticizer.

Examples of commercially available adhesion promoters include but are not limited to Glymo from Evonik and Silquest from Momentive.

An adhesion promoter may be present in an epoxy composition according to the present invention in a quantity of from 0.01 to 5% by weight based on the total weight of the composition, preferably from 0.1 to 2.5%.

An epoxy composition according to the present invention may further comprise an electrically conductive filler. Preferably electrically conductive filler is selected from the group consisting of silver, nickel, carbon, carbon black, graphite, graphene, copper, gold, platinum, aluminium, iron, zinc, cobalt, lead, tin alloys, silver coated copper, silver coated graphite, silver coated polymers, silver coated aluminium, silver coated glass, silver coated carbon, silver coated boron nitride, silver coated aluminium oxide, silver coated aluminium hydroxide and mixtures thereof.

An electrically conductive filler may be present in an epoxy composition according to the present invention in a quantity of from 20 to 90% by weight based on the total weight of the composition, preferably from 30 to 70% and more preferably from 40 to 60%.

In one embodiment the epoxy composition according to the present invention is one component (1k) composition comprising a) an epoxy resin; b) a curing agent; and c) a bio-based epoxy compound having a structure I:

(I)

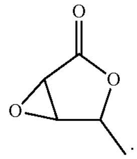
.

The 1k composition according to this embodiment may further comprise any of or all of the above described optional ingredients.

In one embodiment the epoxy composition according to the present invention is two component (2k) composition comprising a first component and a second component, wherein said first component comprising a) an epoxy resin; and c) a bio-based epoxy compound having a structure I:

(I)

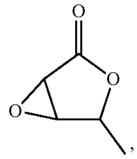
, and wherein said second component comprising b) a curing agent.

The 2k composition according to this embodiment may further comprise any of or all of the above described optional ingredients and they can be either in a first component or in a second component.

The ratio of a first component to a second component can be 1:1 or 2:1 or 4:1 or 10:1 and even 100:1 or 200:1 or 200:122 or 200:142.

The present invention relates to a cured product of an epoxy composition according to the present invention. The epoxy composition according to the present invention is preferably cured under following conditions two days at 23° C. and 50% rh or 30 minutes at 80° C.

The present invention encompasses use of an epoxy composition according to the present invention as a structural adhesive. The epoxy composition according to the present invention is especially useful for applications where low viscosity is required for easy dispensing and wetting. Particularly as a structural adhesive in electronic device assembly, car assembly, car repair, aerospace, rail and defence.

EXAMPLES

Example 1

| First component: | |
|---|---|
| Raw material | |
| Toughener<br>Kane Ace MX153 | 37.78 |
| Epoxy resin<br>Erisys GE 21 | 5.05 |

-continued

| First component: | |
|---|---|
| Raw material | |
| bio-based epoxy compound having a structure I | 2.50 |
| Adhesion promoter GLYMO | 0.70 |
| Toughener/Filler Luzenac 2 | 2.85 |
| Toughener/Filler Cabosil TS 720 | 1.00 |

| Second component: | |
|---|---|
| Raw material | |
| Curing agent Jeffamine D230 | 6.45 |
| Curing agent D.E.H 1502 | 9.10 |
| Curing agent Jeffamine THF-170 | 13.85 |
| Curing agent Ancamine 2264 | 15.30 |
| Curing agent Pentamine DAH | 2.40 |
| Thickener H13L | 1.60 |
| Filler Luzenac 2 | 1.30 |

First component and second component are mixed in a ratio of 200:122.

Example 2

| First component: | |
|---|---|
| Raw material | |
| Toughener Kane Ace MX153 | 37.78 |
| Epoxy resin Erisys GE 21 | 2.55 |
| bio-based epoxy compound having a structure I | 5.0 |
| Adhesion promoter GLYMO | 0.70 |
| Filler Luzenac 2 | 2.85 |
| Filler Cabosil TS 720 | 1.00 |

| Second component: | |
|---|---|
| Raw material | |
| Curing agent Jeffamine D230 | 6.45 |
| Curing agent D.E.H 1502 | 9.10 |
| Curing agent Jeffamine THF-170 | 13.85 |
| Curing agent Ancamine 2264 | 15.30 |

-continued

| Second component: | |
|---|---|
| Raw material | |
| Curing agent Pentamine DAH | 2.40 |
| Thickener H13L | 1.60 |
| Filler Luzenac 2 | 1.30 |

First component and second component are mixed in a ratio of 200:142.

Example 3 (Comparative Example)

| First component: | |
|---|---|
| Raw material | |
| Toughener Kane Ace MX153 | 37.78 |
| Epoxy resin Erisys GE 21 | 2.55 |
| bio-based epoxy compound having a structure I | 0.0 |
| Adhesion promoter GLYMO | 0.70 |
| Filler Luzenac 2 | 2.85 |
| Filler Cabosil TS 720 | 1.00 |

| Second component: | |
|---|---|
| Raw material | |
| Curing agent Jeffamine D230 | 6.45 |
| Curing agent D.E.H 1502 | 9.10 |
| Curing agent Jeffamine THF-170 | 13.85 |
| Curing agent Ancamine 2264 | 15.30 |
| Curing agent Pentamine DAH | 2.40 |
| Thickener H13L | 1.60 |
| Filler Luzenac 2 | 1.30 |

First component and second component are mixed in a ratio of 200:100.

Tensile strength, Dynamic mechanical analysis (DMA) and Lab shear adhesion on steel were measured according to the specifications below. The results are exemplified in the tables below.

Tensile Strength:

Tensile strength is measured according to DIN EN 1465.

Specimen: Type 5A

Pretreatment tensile forms: drying for 30 min at 80° C.

Curing: 30 min at 80° C. (between two steel plates in oven)

TABLE 1

| | Average tensile strength at break in MPa | Average elongation at break in % |
|---|---|---|
| Example 1 | 23.0 | 27.5 |
| Example 2 | 25.4 | 3.1 |
| Example 3 | 24.8 | 10.4 |

DMA was Measured from Cured Films:
Specimen: 35×10×3 mm
Pretreatment forms: drying for 30 min at 80° C.
Curing: 30 min at 80° C. (between two steel plates in oven)

TABLE 2

| | Testing conditions | Tg [° C.] |
|---|---|---|
| Example 1 | −40° C.-200° C., 5K/min | 72.41 |
| Example 2 | −40° C.-200° C., 5K/min | 73.37 |
| Example 3 | −40° C.-200° C., 5K/min | 72.98 |

Lap Shear Adhesion on Steel:
Lap shear adhesion on steel is measured according to DIN EN ISO 527-1/-2.
Specimen: steel/steel (stainless, 14401, 1.5 mm)
Pretreatment specimen: cleaning with ethyl acetate
Adhesions Lap Shear samples: using 200 μm glass beads overlap: 10×25 mm
Curing: 30 min at 80° C. (between two steel plates in oven)

TABLE 3

| | Lab shear strength in MPa |
|---|---|
| Example 1 | 29.9 |
| Example 2 | 25.7 |
| Example 3 | 27.1 |

What is claimed is:

1. An epoxy composition comprising
a) an epoxy resin;
b) a curing agent; and
c) a bio-based epoxy compound other than the epoxy resin and having a structure I:

(I)

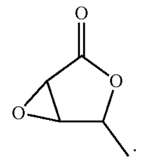

2. The epoxy composition according to claim 1, wherein said bio-based epoxy compound having a structure I is a β-isomer.

3. The epoxy composition according to claim 1, wherein said bio-based epoxy compound having a structure I consists of 100% bio-based carbon atoms according to ASTM D6866.

4. The epoxy composition according to claim 1, wherein said bio-based epoxy compound having a structure I is present in a quantity of from 0.1 to 30% by weight based on the total weight of the composition.

5. The epoxy composition according to claim 1, wherein said epoxy resin is selected from the group consisting of bisphenol A epoxy resins, bisphenol F epoxy resins, biphenyl epoxy resins, naphthalene epoxy resins, diphenyl ether epoxy resins, diphenyl thioether epoxy resins, hydroquinone epoxy resins, biphenyl novolac epoxy resins, cresol novolac epoxy resins, phenol novolac epoxy resins, bisphenol A novolac epoxy resins, trisphenol epoxy resins, tetraphenylolethane epoxy resins, cycloaliphatic epoxy resins, epoxy resins derived from cashew nut shell liquid oil, epoxy resins derived from soybean oil, epoxy resins derived from linseed, epoxy resins derived from rape seed and epoxy resins derived from sun flower, limonene oxide, limonene dioxide, epoxy resin derived from cashew nut shell liquid, sorbitol based polyepoxy resin, glycerol based polyepoxy resin, ethylglycol diepoxy resin and mixtures thereof.

6. The epoxy composition according to claim 1, wherein said epoxy resin is present in a quantity of from 1 to 75% by weight based on the total weight of the composition.

7. The epoxy composition according to claim 1, wherein said curing agent is selected from the group consisting of a latent curing agent, an amine, a thiol, an anhydride, Mannich base, phenolic nucleophiles and mixtures thereof.

8. The epoxy composition according to claim 7, wherein said curing agent is a latent curing agent and said epoxy composition is a one component (1k) composition.

9. The epoxy composition according to claim 7, wherein said curing agent is selected from the group consisting of an amine, a thiol, Mannich base and mixtures thereof, and said epoxy composition is a two component (2k) composition comprising a first component and a second component wherein said curing agent is in a different component than said epoxy resin and said epoxy compound having structure I.

10. The epoxy composition according to claim 1, wherein said curing agent is present in a quantity of from 20 to 60% by weight based on the total weight of the composition.

11. The epoxy composition according to claim 1, wherein said composition further comprises a toughener.

12. The epoxy composition according to claim 11, wherein said toughener is selected from the group consisting of core shell rubber particles, liquid rubbers with two or more epoxy-reactive groups, OH-terminated polyether polyols, OH-terminated thermoplastic polyurethanes, OH-terminated polyethers, polyether urethanes, polyether rubber modified epoxy resins, fatty acid modified epoxy resins, polyether amine epoxy resins, rubber particles, styrene-butadiene-isoprene based block copolymers, polytetrahydrofuran-based toughener, cardolite toughener, polyfarnesene polyol, capped elastomeric urethanes, block copolymer rubbers, epoxy-capped elastomeric polyethers, epoxy-capped elastomeric polyesters, inorganic fillers, reinforcing agents and mixtures thereof.

13. The epoxy composition according to claim 11, wherein said toughener is present in a quantity of from 0.1 to 50% by weight based on the total weight of the composition.

14. A cured product of the epoxy composition according to claim 1.

15. The epoxy composition according to claim 1 for use as a structural adhesive, a coating or a primer.

* * * * *